US009364118B2

(12) United States Patent
Henry et al.

(10) Patent No.: US 9,364,118 B2
(45) Date of Patent: Jun. 14, 2016

(54) SIFTER WITH PULL CORD

(71) Applicant: FOX RUN BRANDS, Ivyland, PA (US)

(72) Inventors: Louis F. Henry, Scarsdale, NY (US); Chris Mellen, New York, NY (US)

(73) Assignee: Fox Run Brands, Ivyland, PA (US)

(*) Notice: Subject to any disclaimer, the term of this patent is extended or adjusted under 35 U.S.C. 154(b) by 67 days.

(21) Appl. No.: 14/194,584

(22) Filed: Feb. 28, 2014

(65) Prior Publication Data

US 2014/0246121 A1 Sep. 4, 2014

Related U.S. Application Data

(60) Provisional application No. 61/771,775, filed on Mar. 1, 2013.

(51) Int. Cl.
*A47J 43/22* (2006.01)

(52) U.S. Cl.
CPC ........................................ *A47J 43/22* (2013.01)

(58) Field of Classification Search
CPC ........................................................ A47J 43/22
USPC ................................ 209/233, 357, 358, 400
See application file for complete search history.

(56) References Cited

U.S. PATENT DOCUMENTS

| | | | | |
|---|---|---|---|---|
| 524,892 A * | 8/1894 | Eichler | ................... | A47J 43/22 209/358 |
| 542,476 A | 7/1895 | House | | |
| 809,178 A | 1/1906 | Farmer | | |
| 1,005,991 A * | 10/1911 | McEachron | ........ | B01F 7/00208 209/357 |
| 1,136,243 A * | 4/1915 | Lawlor | ................... | A47J 43/22 209/357 |
| 1,333,419 A * | 3/1920 | Hoops | ..................... | A47J 43/22 209/258 |
| 1,482,873 A * | 2/1924 | Ullrich | .................... | A47J 43/22 209/251 |
| 1,610,300 A * | 12/1926 | Lovejoy | .................. | A47J 43/22 209/251 |
| 1,631,105 A | 5/1927 | Nall et al. | | |
| 1,955,847 A * | 4/1934 | Dickey | .................... | A47J 43/22 209/357 |
| 2,244,186 A * | 6/1941 | Braun | ..................... | A47J 43/22 209/251 |
| 2,314,186 A * | 3/1943 | Zuck | ....................... | A47J 43/22 209/357 |
| 2,416,810 A * | 3/1947 | Bailey | ...................... | B07B 1/02 209/251 |
| 2,592,850 A * | 4/1952 | Barbery | ................. | A47J 43/22 209/357 |
| 2,607,491 A * | 8/1952 | Lucian | .................... | A47J 43/22 209/357 |
| 3,415,376 A * | 12/1968 | Smith | ..................... | A47J 43/22 209/236 |
| 4,136,022 A * | 1/1979 | Hutzler | .................. | B07B 1/528 206/515 |
| 4,534,858 A * | 8/1985 | Aldrich | ................... | A47J 43/22 209/236 |
| 5,850,923 A * | 12/1998 | DeCoster | ................ | A47J 43/22 209/357 |

OTHER PUBLICATIONS

International Search Report dated Jul. 3, 2014 from PCT/US2014/019689, 3 pages.

(Continued)

*Primary Examiner* — Nicolas A Arnett
(74) *Attorney, Agent, or Firm* — Ohlandt, Greeley, Ruggiero & Perle, L.L.P.

(57) ABSTRACT

The sifter of the present disclosure uses a pull cord in communication to assist with the sifting of a powdered substance (e.g., flour, sugar). A user places the substance to be sifted into the open end of a top container and actuates the pull cord, which in turn rotates a blade to agitate the powder and help it pass through a screen into a lower container. This design allows a user to keep their hands from touching the powdered product, and for simple cleanup.

9 Claims, 6 Drawing Sheets

(56) References Cited

OTHER PUBLICATIONS

Written Opinion dated Jul. 3, 2014 from PCT/US2014/019689, 8 pages.

International Preliminary Report on Patentability dated Sep. 1, 2015 from the corresponding International Application No. PCT/US2014/019689, 5 pages.

* cited by examiner

US 9,364,118 B2

SIFTER WITH PULL CORD

CROSS-REFERENCE TO RELATED APPLICATIONS

The present application claims priority to U.S. Provisional Application No. 61/771,775, filed on Mar. 1, 2013, which is herein incorporated by reference.

BACKGROUND OF THE DISCLOSURE

1. Field of the Disclosure

The present disclosure relates to a device for sifting powdered materials such as flour. More particularly, the present disclosure relates to a device that has a pull cord to assist in the sifting.

2. Discussion of the Related Art

A sifter is a common kitchen implement used for removing lumps or agglomerations in common powdered baking items, such as flour or sugar. Currently available sifting devices are difficult to use, as they are often simply rings that hold a mesh screen. The user loads the powder over one side of the screen, and then must force the powder through the screen, with agitation or shaking. This can be manually labor intensive, and also messy. The present disclosure addresses these concerns.

SUMMARY OF THE DISCLOSURE

The present disclosure provides a sifter that has an upper container, a collar, and a lower container. The collar has a pull cord that actuates a blade, and a mesh screen. The user adds the powdered product to be sifted into the upper container, and pulls the cord. The blade agitates the powder, so that it passes easily though the screen. Thus, the user can avoid the need for agitating the sifter themselves, or touching the powder.

In one embodiment, the present disclosure provides a sifter. The sifter comprises an upper container, a lower container, and a collar between the upper container and the lower container and connected to each. The upper container, the collar, and the lower container are stacked in vertical alignment and have a vertical axis therethrough. The collar further comprises a mesh screen, a spring, a cord, and a blade. The cord, the spring, and the blade are operably connected to one another, so that actuation of the cord causes the blade to rotate about the vertical axis, to assist in the passage of powder from said upper container, through the mesh screen, and into the lower container.

DETAILED DESCRIPTION OF THE DISCLOSURE

Figure 1:
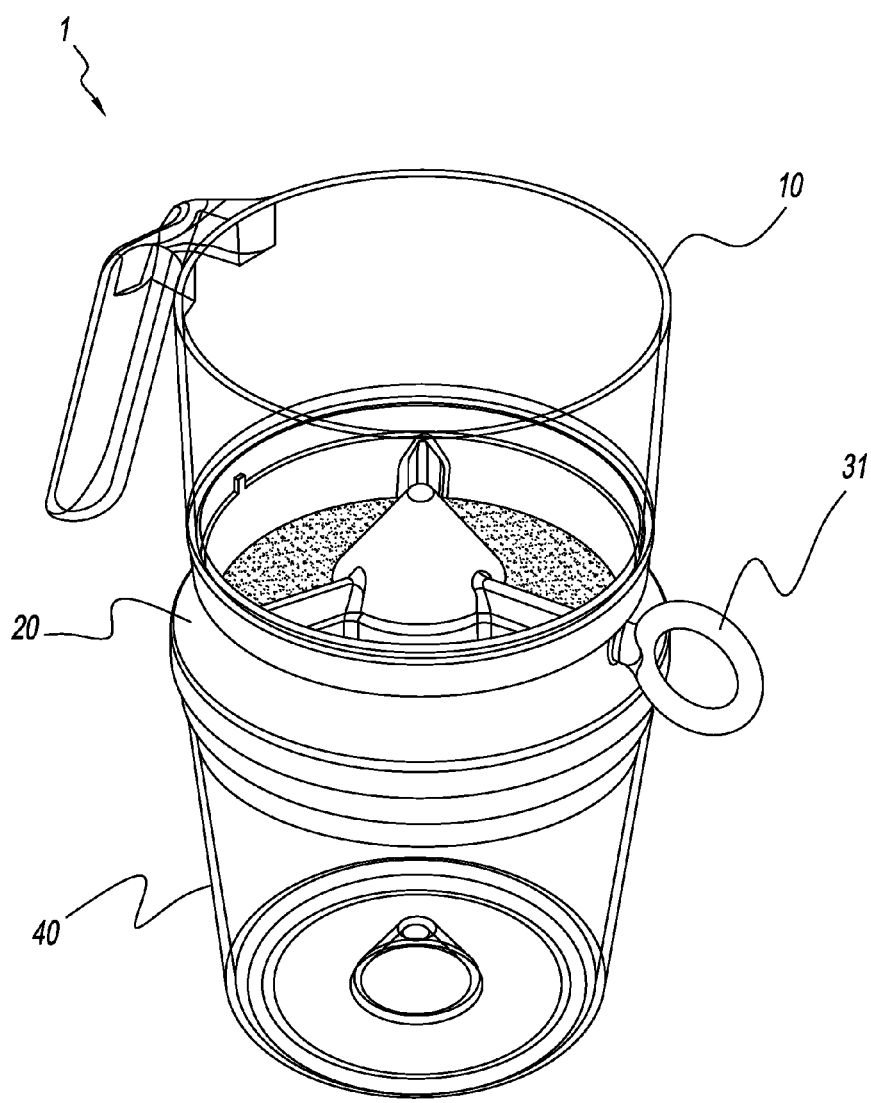
FIG. 1 shows a top, perspective view of the sifter of the present disclosure.

Referring to the drawings, and in particular FIG. 1, sifter 1 of the present disclosure is shown. Sifter 1 has upper container 10, collar 20, and lower container 40. Collar 20 has a pull cord 30 operably connected thereto. To use sifter 1, the user loads a powdered substance (e.g., flour, sugar) into the open top of upper container 10. Cord 30 is connected to a hub 32, which is in turn connected to a blade 34. Through the mechanism discussed in greater detail below, pulling cord 30 causes blade 34 to rotate. The rotation of blade 34 agitates the powder in upper container 10, easing its passage through mesh screen 26 and into lower container 40.

Thus, sifter 1 is highly advantageous over currently available devices. With cord 30, the user can sift powered substances without having to touch the product. This is sanitary, and allows the user to keep their hands clean for other tasks. Pulling cord 30 is also easier than having to manually agitate the powder by shaking or otherwise manipulating a device. All components of sifter 1 can be dishwasher-safe, for easy cleaning. As shown in FIG. 1, sifter 1 can collapse into a smaller profile for easy storage, by placing lower container 40 within upper container 10.

Figure 2:
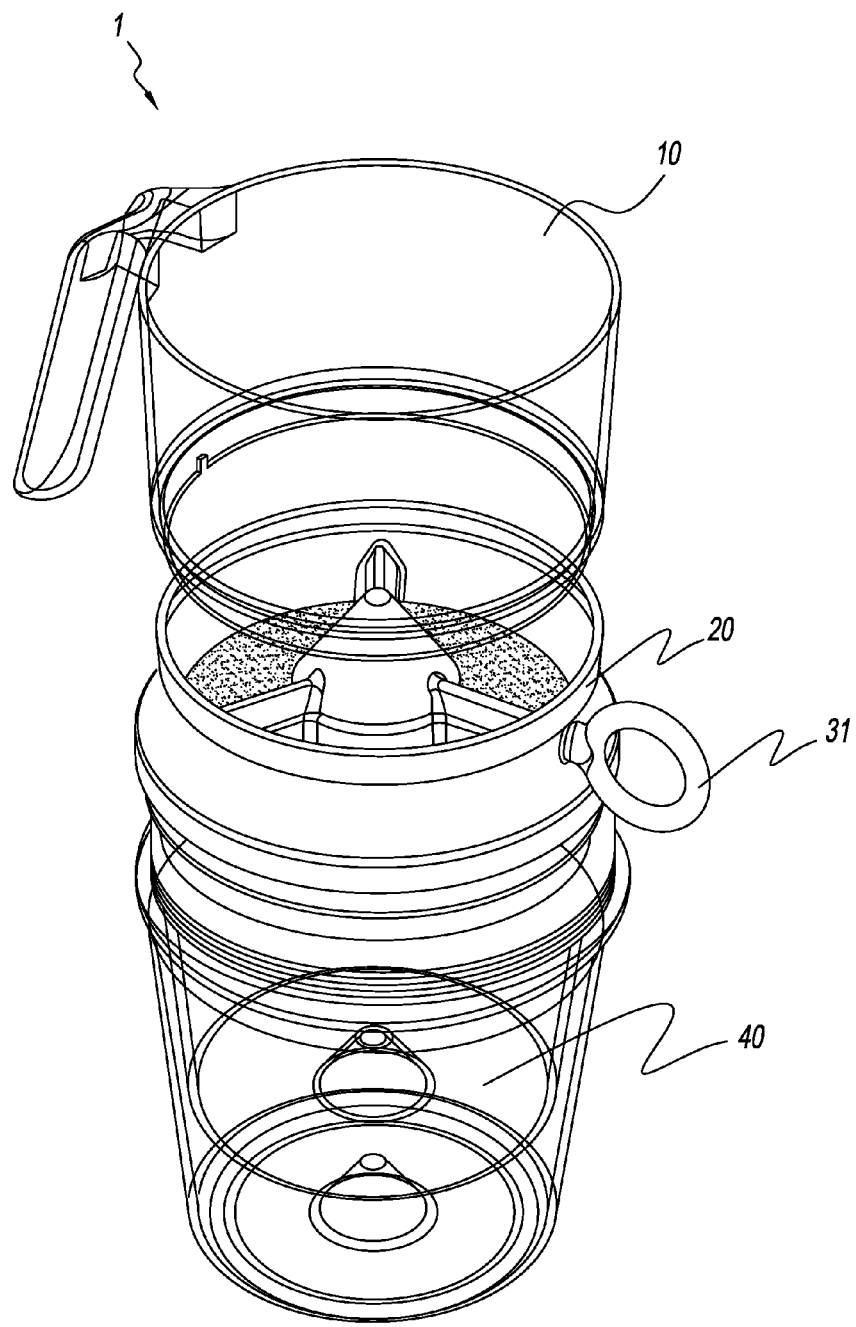
FIG. 2 shows an exploded view of the sifter of FIG. 1.
Figure 3:
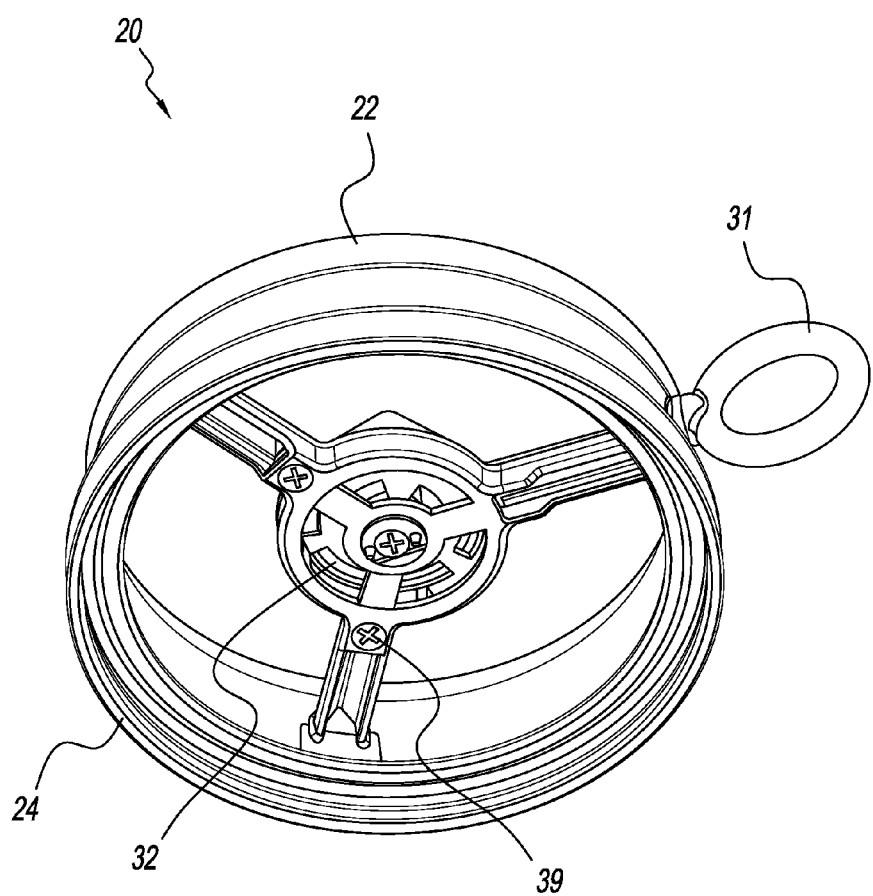
FIG. 3 shows a bottom, perspective view of the collar of the sifter of FIG. 1.
Figure 4:
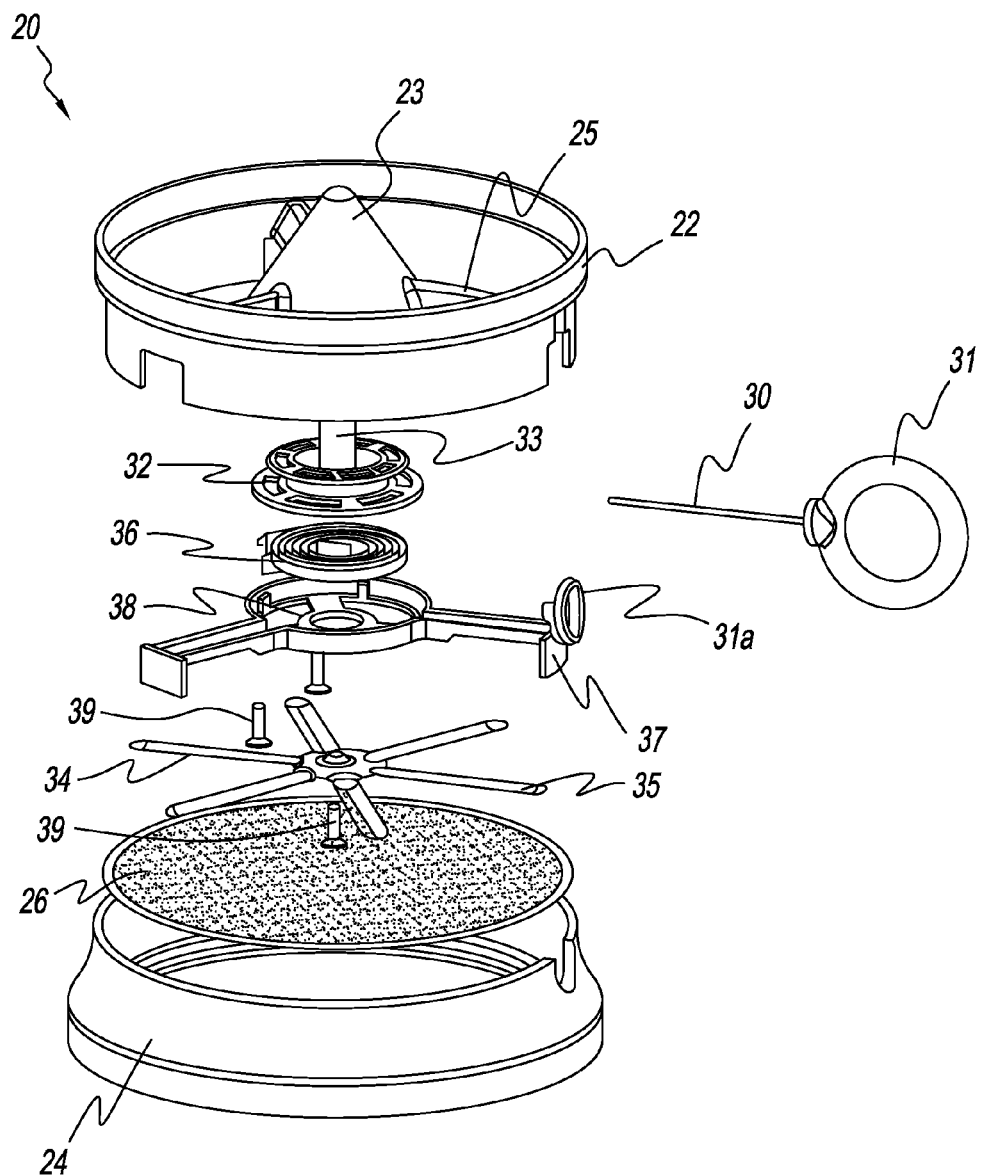
FIG. 4 shows an exploded view of the color of FIG. 3.
Figure 5:
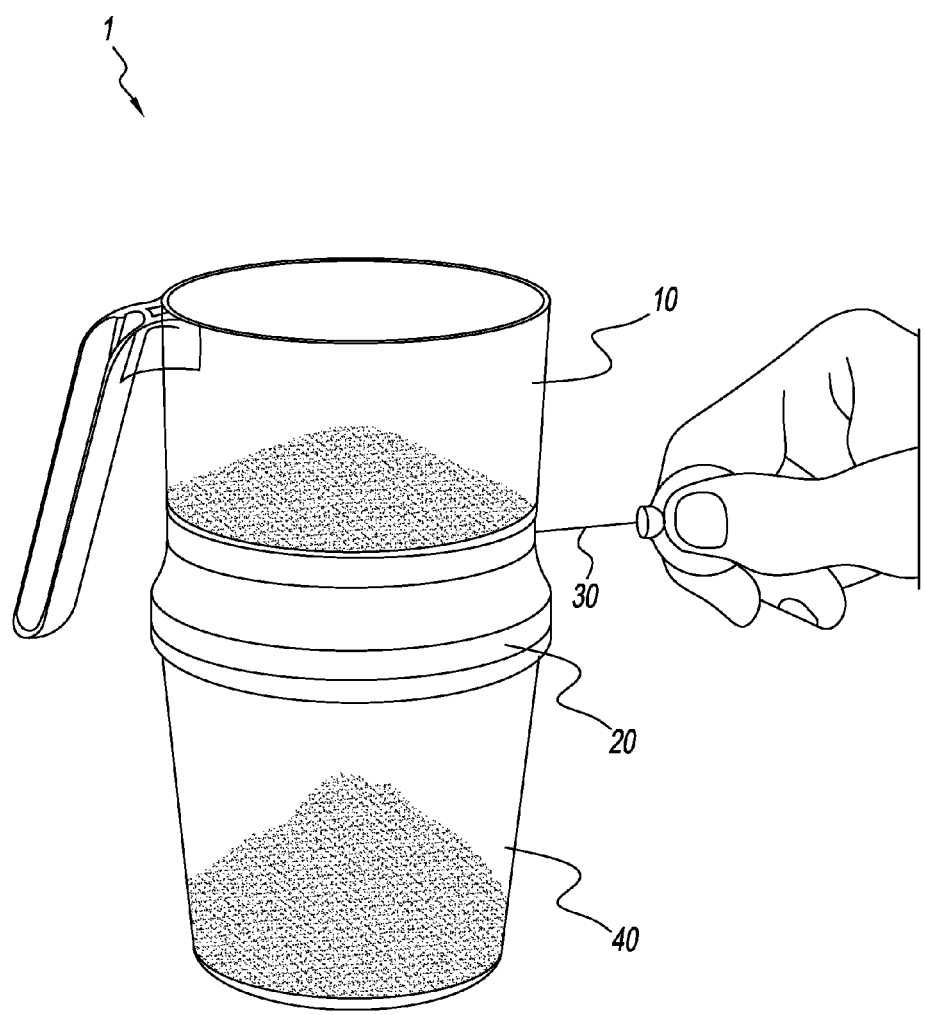
FIG. 5 shows show a user operates the sifter of FIG. 1.
Figure 6:
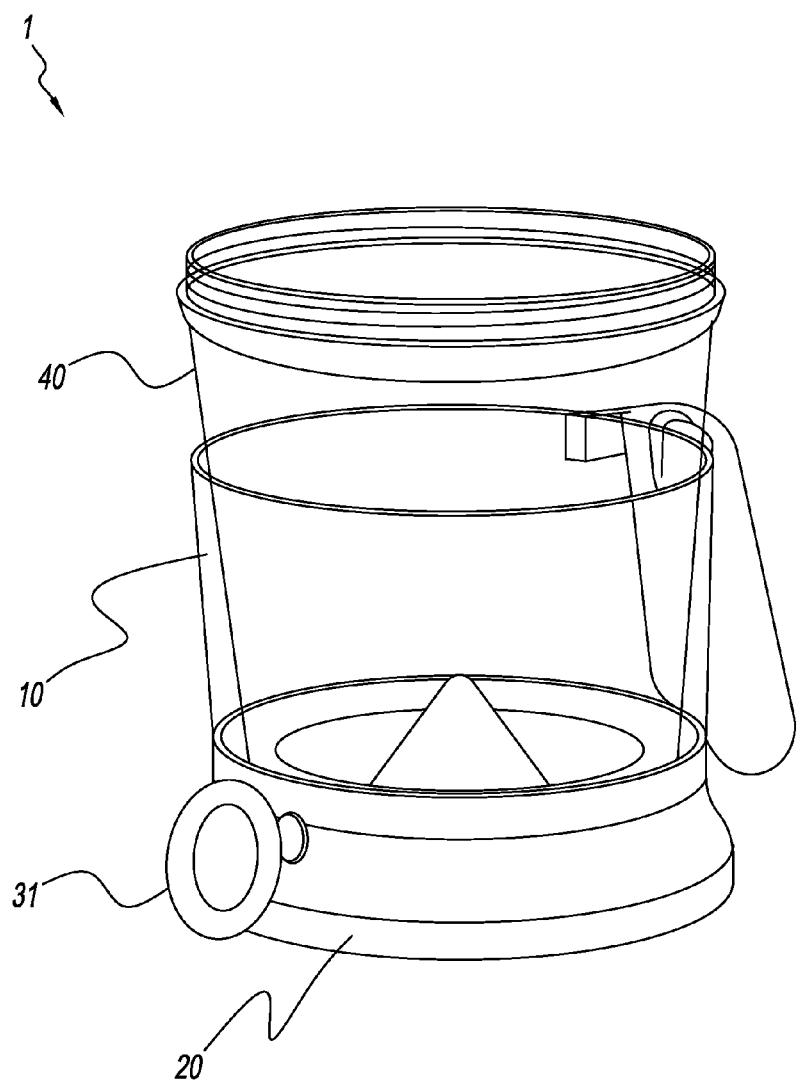
FIG. 6 shows the sifter of FIG. 1, in a collapsed mode for storage.

Referring specifically to FIG. 4, collar 20 and cord 30 are shown in exploded view. Collar 20 has cover 22 and base 24, which are connected to each other and hold mesh screen 26 between them. Upper container 10 can be connected to cover 22, and lower container 40 can be connected to base 24 as shown (FIGS. 1-2). The connection can be threaded, as shown, or with a snap- or friction-fit. The connection between cover 22 and base 24 can also be threaded, or a snap- or friction-fit.

Also between cover 22 and base 24 is the mechanism by which cord 30 causes blade 34 to rotate, easing the passage of powder through screen 26. Cord 30 is connected to a hub 32. Hub 32 has a central axle 33, the latter of which is operably connected to blade 34 and a mainspring (i.e., a spiral torsion spring) 36. Mainspring 36 rests in support 38.

The connection between the above-discussed components is such that when the user pulls back on cord 30 (via manipulation of ring 31), hub 32 rotates, forcing mainspring 36 to twist, storing energy therein. When the user lets go of cord 30 and ring 31, mainspring 36 returns to its relaxed state, which retracts cord 30 toward collar 20. During both the winding and release of mainspring 36, blade 34 rotates, sifting the powder in upper container 10. Although the shown embodiment uses a mainspring 36 to effect the movement of blade 36, other devices for storing and releasing energy while rotating blade 34 are contemplated by the present disclosure. Cover 22 can have a cap 23 to house and partially protect hub 32 from the powder passing through. Cord 30 and ring 31 can fit into a plug 31a in collar 20.

Blade 34 can have one or more spokes 35, which assist with the sifting operation. In the shown embodiment, there are six spokes 35. The present disclosure contemplates any number of spokes 35 suitable for sifting efficiently, while still maintaining mechanical simplicity and stability. Support 38 can have horizontal branches 37 for connecting to the interior of cover 22 and base 24, and which align with corresponding structures 25 on cover 22. Support 38 and hub 32 can be connected to one another with one or more fasteners 39.

The materials of sifter 1 can be those suitable for contact with food, and also that can withstand machine-washing. In one embodiment, upper container and lower container 40 can be made of a plastic such as styrene-acrylonitrole resin (SAN). Cover 22, base 24, ring 31, and plug 31a can also be made of a plastic, such as acrylo-nitrile-butadiene styrene (ABS). Hub 32 and support 38 can also be made of a plastic, such as nylon. Blade 34, cord 30, and mesh 26 can be made of stainless steel. The present disclosure contemplates that each of the above-described components can be made of any suitable plastic (e.g., SAN, ABS, nylon) or metal (e.g., stainless steel).

While the present disclosure has been described with reference to one or more particular embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this disclosure.

What is claimed is:

1. A sifter, comprising:
    an upper container;
    a lower container; and
    a collar between said upper container and said lower container and connected to each, of said upper container and said lower container, so that said upper container, said collar, and said lower container are stacked in vertical alignment and have a vertical axis therethrough;
    wherein said collar further comprises a mesh screen, a spring, a cord, and a blade, connected to one another along said vertical axis, and
    wherein said cord, said spring, and said blade are operably connected to one another, so that actuation of said cord causes said blade to rotate about said vertical axis, to assist in the passage of powder from said upper container, through said mesh screen, and into said lower container.

2. The sifter of claim 1, wherein said collar further comprises a hub, wherein said cord is connected to said hub, said hub is connected to said spring, and said spring is connected to said blade, along said vertical axis, so that actuation of said cord causes said hub to rotate and wind said spring, which in turn causes said blade to rotate.

3. The sifter of claim 2, further comprising a support for holding said spring, wherein said support is connected to said blade, said spring, and said hub along said vertical axis.

4. The sifter of claim 1, wherein said spring is a spiral torsion spring.

5. The sifter of claim 1, wherein said blade comprises a plurality of radial spokes.

6. The sifter of claim 1, wherein said hub comprises a central axle along said vertical axis, and said cord is wound around said central axle.

7. The sifter of claim 1, wherein said collar comprises a cover connected to said upper container, and a base connected to said lower container, and wherein said mesh screen, said spring, said cord, and said blade are disposed between said cover and said base.

8. A sifter, comprising:
    a container;
    a collar connected to said container at a bottom end thereof, so that said container and said collar are stacked in vertical alignment and have a vertical axis therethrough;
    wherein said collar further comprises a mesh screen, a spring, a cord, and a blade connected to one another along said vertical axis, and
    wherein said cord, said spring, and said blade are operably connected to one another, so that actuation of said cord causes said blade to rotate about said vertical axis, to assist in the passage of powder from said upper container, through said mesh screen.

9. The sifter of claim 8, further comprising a second, bottom container connected to said collar.

* * * * *